Dec. 17, 1957 W. R. YOUNG, JR 2,817,079

SWITCHING NETWORK USING DIODES AND TRANSFORMERS

Filed May 22, 1956 2 Sheets-Sheet 1

INVENTOR
W. R. YOUNG, JR.
BY R. O. Covell
ATTORNEY

Dec. 17, 1957 W. R. YOUNG, JR 2,817,079
SWITCHING NETWORK USING DIODES AND TRANSFORMERS
Filed May 22, 1956 2 Sheets-Sheet 2
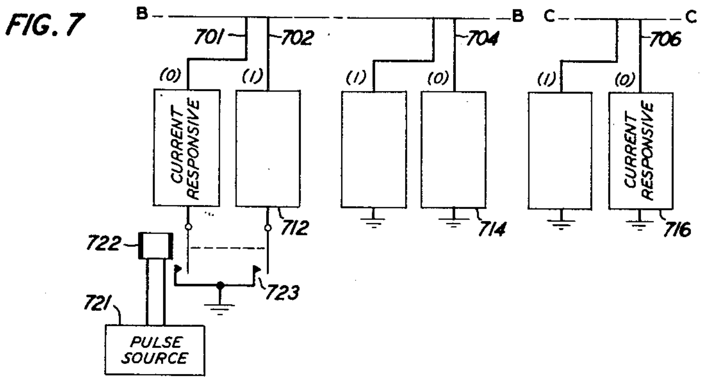
FIG. 8
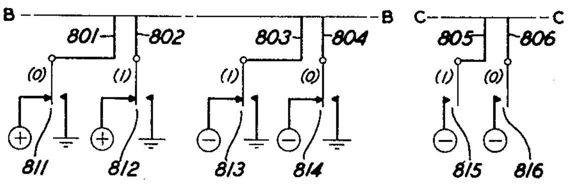
FIG. 9
SCANNING
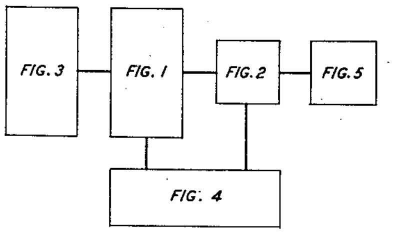
FIG. 10
MARKING
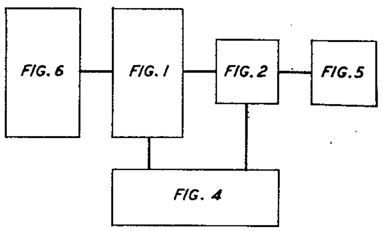
FIG. 11
TRANSLATING
ONE OUT OF EIGHT INPUTS TO BINARY CODE ON THREE OUT OF SIX LEADS
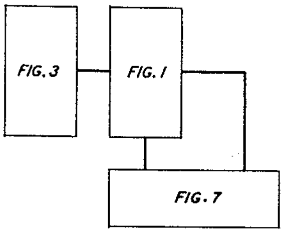
FIG. 12
TRANSLATING
BINARY CODE ON THREE OUT OF SIX LEADS TO ONE OUT OF EIGHT LEADS
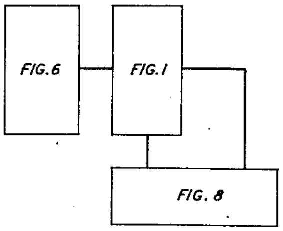
INVENTOR
W. R. YOUNG, JR.
BY
R. O. Covell
ATTORNEY United States Patent Office 2,817,079 Patented Dec. 17, 1957

2,817,079

SWITCHING NETWORK USING DIODES AND TRANSFORMERS

William R. Young, Jr., Summit, N. J., assignor to Bell Telephone Laboratories, Incorporated, New York, N. Y., a corporation of New York Application May 22, 1956, Serial No. 586,560
20 Claims. (Cl. 340—367)

This invention relates to a switching network which employs transformers and asymmetrical circuit elements to provide selectively conductive low impedance electrical paths between input, output and control conductors.

In most multifunctional telephone switching circuits there is a need for "signaling circuits" to associate input, output and control conductors for short periods of time. Exemplary of the type of functions required in a multifunctional telephone switching circuit are scanning, marking and translating. Heretofore, such circuits have utilized relays, stepping switches, or diode and resistance networks either solely or in combination.

Relays and stepping switches are generally expensive and bulky and they require considerable operating power. Diode and resistance networks, which perform some of the requisite functions, are less bulky and consume less power than their electromechanical counterpart; however, the power consumed is still considerable.

It is an object of this invention to provide a single space-saving structure to provide the scanning, marking and translating functions required in a modern telephone switching system.

Another object of this invention is to provide a structure which can be operated at speeds commensurate with modern switching concepts.

Another object of this invention is to minimize the number of circuit elements required in a multifunctional switching circuit.

A further object of this invention is to advantageously minimize the power required to perform the requisite functions and to minimize the number of synchronized voltages required to energize the structure.

In accordance with one feature of this invention linear transformers and diodes are interconnected to selectively provide combinations of low impedance electrical paths between input, output and control conductors. These combinations of paths are selectively rendered conductive by the application of significant combinations of potentials to the various conductors. Advantageously, current, other than minor inductive charging currents, is present only in the selected combination of paths. The particular arrangement of transformers and diodes adopted in the exemplary embodiment of this invention provides a high degree of flexibility in that one structure may be used to implement scanning, marking and translating circuits.

The invention and the features thereof will be understood more fully and clearly from the following detailed description with reference to the accompanying drawings in which:

Figs. 1 and 2 comprise an exemplary embodiment of this invention having eight selectable conductors with three stages of binary control conductors;

Fig. 7 is means for applying significant potentials to the binary conductors through means responsive to activation of the binary conductors;

Fig. 8 is means for applying other significant potentials to the binary conductors;

Fig. 9 is the arrangement of the foregoing figures to provide a scanning circuit having eight selectable inputs;

Fig. 10 is the arrangement of the foregoing figures to provide a marking circuit having eight selectable outputs;

Fig. 11 is the arrangement of the foregoing figures to provide a circuit to translate a signal from one-out-of-eight input conductors to a signal on three-out-of-six binary output conductors; and Fig. 12 is the arrangement of the foregoing figures to provide a circuit to translate a signal from three-out-of-six binary conductors to a signal on one-out-of-eight outputs.

Figures 1, 2, 3, 4, 5, 6:
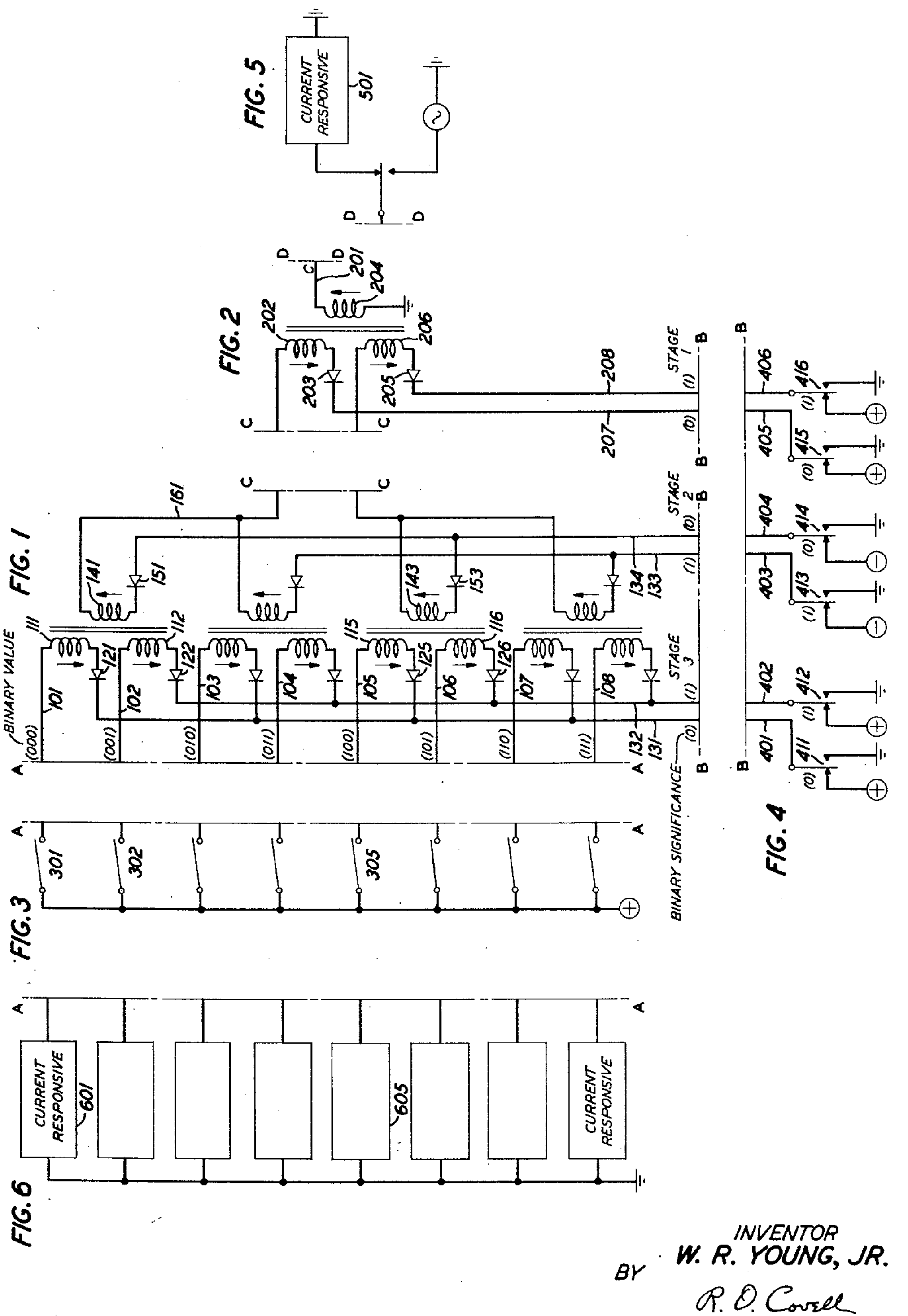
Fig. 3 is means for selectively applying a significant potential to the selectable conductors.
Fig. 4 is means for selectively applying significant potentials to the binary conductors.
Fig. 5 is means responsive to activation of the common conductor C and means for applying significant potentials to the common conductor C.
Fig. 6 is means for applying a significant potential to the selectable conductors through means responsive to the activation of the selectable conductors.

The exemplary embodiment of the invention herein disclosed has eight selectable conductors and three stages of control conductors which have binary significance. The invention, however, is not limited to these codes but rather is very flexible and lends itself to many other input and output code arrangements. For example, the number of stages can be varied and the control conductors may have decimal or other significance.

*General description*

A scanning or selecting circuit chooses one conductor from a plurality of similar conductors by the application of predetermined electrical information to the control conductors of the scanning circuit. An example of such a circuit is shown in Fig. 9. A circuit which interrogates a plurality of telephone lines to determine which one of the lines is requesting service is an example which is commonly known as a line scanner. In Figs. 1 and 2, the application of information in binary code form to the control conductors shown at cut-line B—B serves to scan the eight conductors shown at cut-line A—A. Application of a significant potential on any one of the eight lines co-incident with application of the code information discrete to that line on the control conductors produces an output pulse at the common conductor C which is shown at cut-line D—D.

A marking circuit places a significant marking potential on one conductor chosen from a plurality of similar conductors by the application of predetermined electrical code information to the control conductors of the marking circuit. An example is shown in Fig. 10. This is another type of selecting circuit. In Figs. 1 and 2 simultaneous application of the source of potentials shown in Fig. 5 to the common conductor C and the application of electrical code information to the control conductors shown on cut-line B—B serves to produce an output current in the conductor shown at cut-line A—A which is represented by the applied code input.

Translation comprises the conversion of information in one electrical code form to information in another electrical code form. Examples of such a circuit are shown in Figs. 11 and 12. In the example shown in Fig. 11 an input code consisting of information on one of the eight conductors shown in Fig. 1 at cut-line A—A produces an output on three of the six conductors shown at line B—B. This is a reversible translator, therefore, code information on three out of the six conductors shown at cut-line B—B will produce an output on the one of the eight conductors represented by the three-out-of-six code input.

*Scanning*

The arrangement of Figs. 1, 2, 3, 4, and 5, as shown in Fig. 9 comprises a circuit which is capable of scanning the input conductors 101 to 108 and producing an output at conductor 201. For the purposes of explanation it is assumed that conductors 101 to 108 represent telephone lines and that closure of the switches shown in Fig. 3 indicates that the line associated with the closed switch is requesting service from the switching equipment. Assume that lines 101, 102 and 105 are requesting service as indicated by the closure of switches 301, 302 and 305. The switches of Fig. 4 can be positioned to interrogate any of the lines 101 to 108. Positioning switches 411 through 416 to simultaneously apply ground on conductor 401, positive battery on conductor 402, negative battery on conductor 403, ground on conductor 404, ground on conductor 405, and positive battery on conductor 406 serves to interrogate line 101. A current pulse will be produced from positive battery through switch 301, transformer winding 111, diode 121, conductor 131, conductor 401 and switch 411 to ground. This will induce a voltage in transformer winding 141 and current will flow from ground through switch 414, conductor 404, conductor 134, diode 151, transformer winding 141, conductor 161, transformer winding 202, diode 203, conductor 207, conductor 405 and switch 415 to ground. Current flowing in transformer winding 202 induces a voltage in transformer winding 204 which causes a current to flow from ground through transformer winding 204, conductor 201, and the current responsive device 501 to ground. Although there is a positive voltage applied to conductor 102 through switch 302 current will flow in conductor 102 as diode 122 is back biased by the application of positive battery to conductor 402 through switch 412. Positive battery applied to conductor 105 will tend to cause current to flow in transformer winding 115, diode 125, conductor 131, conductor 401 and switch 411 to ground. However, the application of positive battery through switch 416 to conductor 406 back biases diode 205 and therefore the electrical path from ground through switch 414, conductor 404, diode 153, transformer winding 143, transformer winding 206, diode 205, conductor 208, conductor 406 and switch 416 to positive battery is of high impedance. This high impedance is reflected from transformer winding 143 to transformer winding 115 and the current which flows through transformer winding 115 and diode 126 is limited to the transformer magnetizing current. Therefore, with the application of potentials to conductors 401 through 406, where such potentials are discrete to conductor 101, an output pulse will be received at conductor 201 only if switch 301 is closed and the operation will not be effected by the presence or absence of potentials on other lines. It should be noted that a mere change of potential on the selectable lines is adequate and there need not be an accompanying change in impedance.

*Marking*

The arrangement of Figs. 1, 2, 4, 5, and 6, as shown in Fig. 10, comprises a circuit for applying a marking potential to any desired one of lines 101 to 108 by application of discrete control potentials to conductors 401 to 406. In this case, lines 101 to 108 are all terminated with current responsive devices connected to ground. A marking potential may be applied to conductor 105 by operating switches 411 to 416 to place ground on conductor 401, positive battery on conductor 402, negative battery on conductor 403, ground on conductor 404, positive battery on conductor 405, and ground on conductor 406. These control potentials effect a low impedance path from ground through conductor 404, conductor 134, diode 153, transformer winding 143, transformer winding 206, diode 205, conductor 208, conductor 406, and switch 416 to ground. The application of an alternating-current signal or a voltage pulse to conductor C, as would be applied by the generator of Fig. 5, causes current in transformer winding 204. This current, in turn, causes current in the foregoing low impedance circuit. It should be noted that positive battery through switch 415 applied to conductor 405 back biases diode 203 and causes transformer winding 202 to be in a high impedance path in which there will be little or no current. Current flow in transformer winding 143 induces voltages into transformer windings 115 and 116. Transformer winding 116 is in a high impedance path because of the positive potential applied to conductor 402 through switch 412. This back biases diode 126 and therefore only limited current will flow in transformer winding 116. The path which includes current responsive device 605, line 105, transformer winding 115, diode 125, conductor 131, conductor 401, and switch 411 to ground, however, provides a low impedance path for currents which tend to flow because of the voltage induced in transformer winding 115. Therefore, a current pulse is selectively provided in current responsive device 605 without activation of the other current responsive devices connected to lines 101 to 108.

*Translating*

The arrangement of Figs. 1, 3 and 7, as shown in Fig. 11, comprises a circuit which will accept code information on one-out-of-eight input conductors and translate this to code information on three-out-of-six output conductors. Input information comprising the placement of a positive potential on conductor 102 by the closure of switch 302 will provide output pulses in three of the conductors 401 to 406. The binary designations applicable to conductors 101 to 108 are shown in parenthesis above the respective lines. The binary significance of each of conductors 131 to 134, 207 and 208 is also designated on the drawings. Therefore, an input on conductor 102 which has a binary value of "001" will produce current pulses in conductors 706, 704, and 702. The pulse source 721 causes relay 722 to apply ground pulses simultaneously to conductors 701 and 702. An input may be tolerated on only one of the eight conductors at any time. A current pulse flows from positive battery through switch 302, conductor 102, transformer winding 112, diode 122, conductor 132, conductor 702, current responsive device 712, and contact 723 to ground. This current pulse induces a voltage in transformer winding 141 which causes current to flow in current responsive device 714, conductor 704, conductor 134, diode 151, transformer winding 141, conductor 161, conductor 706 and current responsive device 716 to ground. Therefore, an input on conductor 102 which has the binary value of "001" causes current to flow in the "0" conductor of stage one, the "0" conductor of stage two, and the "1" conductor of stage three.

The translation process can be reversed by arranging Figs. 1, 6, and 8 as shown in Fig. 12. This arrangement provides a circuit which translates coded electrical input information on three-out-of-six conductors to coded electrical information on one-out-of-eight output conductors. Input information having binary significance of "000" provided by the positioning of switches 811 through 816 to provide negative battery on conductor 806, ground on conductor 804, negative battery on conductor 803, positive battery on conductor 802, and ground on conductor 801 will produce a current pulse in current responsive device 601. This device is connected to conductor 101 which has a binary value of "000." These input potentials cause current to flow in a low impedance path which includes switch 816, conductor 806, conductor 161, transformer winding 141, diode 151, conductor 134, conductor 804 and switch 814. The current through transformer winding 141 will induce a voltage in transformer windings 111 and 112, however, the application of positive battery to conductor 802 through switch 812 will back bias diode 122 and prevent the flow of current through this path. Current, however, will flow in the path which includes current responsive device 601, transformer winding 111, diode 121, conductor 131, conductor 801 and switch 811 to ground. Therefore, electrical information on three input conductors having binary significance of "000," respectively, provides an output pulse on one-out-of-eight conductors having a binary value of "000."

What is claimed is:

1. A signaling network comprising a pularity of first conductors, means to apply any one of a plurality of discrete combinations of potentials to said first conductors, a plurality of transformers, a plurality of second conductors, means to apply any one of a plurality of discrete combinations of potentials to said second conductors, a third conductor, means to apply significant potentials to said third conductor, a plurality of asymmetrical circuit elements, said asymmetrical circuit elements and said transformers arranged to selectively provide any one of a plurality of discrete combinations of low impedance electrical paths between said first, second and third conductors.

2. A signaling network comprising a plurality of first conductors, means to apply any one of a plurality of discrete combinations of potentials to said first conductors, a plurality of transformers connected to said first conductors, a plurality of second conductors, means to apply any one of a plurality of discrete combinations of potentials to said second conductors, wherein each discrete potential combination is distinctive to one of said first conductors, a third conductor, means to apply significant potentials to said third conductor, a plurality of asymmetrical circuit elements, said transformers and said asymmetrical circuit elements arranged to selectively provide any one of a plurality of discrete combinations of low impedance electrical paths between said first, second and third conductors, said low impedance paths selectively rendered conductive by the application of the voltage combination, distinctive to said first conductor, to said plurality of second conductors.

3. A signaling network comprising a plurality of first conductors, means to apply any one of a plurality of discrete combinations of potentials to said first conductors, a plurality of transformers, a plurality of second conductors, means to apply any one of a plurality of discrete combinations of potentials to said second conductors, wherein each discrete potential combination is distinctive to one of said first conductors, a third conductor, means to apply significant potentials to said third conductor, a plurality of asymmetrical circuit elements connecting said second conductors and said transformers, said transformers and said asymmetrical circuit elements arranged to selectively provide any one of a plurality of discrete combinations of low impedance electrical paths between said first, second and third conductors, said low impedance paths selectively rendered conductive by the application of the voltage combination, distinctive to said first conductor, to said plurality of second conductors.

4. A signaling network comprising a plurality of first conductors, means to apply any one of a plurality of discrete combinations of potentials to said first conductors, a plurality of transformers connected to said first conductors, a plurality of second conductors, means to apply any one of a plurality of discrete combinations of potentials to said second conductors, wherein each discrete potential combination is distinctive to one of said first conductors, a third conductor, means to apply significant potentials to said third conductor, a plurality of asymmetrical circuit elements connecting said second conductors and said transformers, said transformers and said asymmetrical circuit elements arranged to selectively provide any one of a plurality of discrete combinations of low impedance electrical paths between said first, second and third conductors, said low impedance paths selectively rendered conductive by the application of the voltage combination, distinctive to said first conductor, to said plurality of second conductors.

5. A scanning network comprising a plurality of input conductors, means to apply a significant potential to any one of said input conductors, a plurality of transformers, a plurality of control conductors, means to apply any one of a plurality of discrete combinations of potentials to said control conductors, an output conductor, a current responsive device connected to said output conductor, a plurality of asymmetrical circuit elements, said asymmetrical circuit elements and said transformers arranged to selectively provide low impedance electrical paths between any one of said input conductors and said output conductor, said low impedance electrical path selectively rendered conductive by the application of the discrete control conductor voltage combination which is distinctive to said input conductor.

6. A scanning network comprising a plurality of input conductors, means to apply a significant potential to any one of said input conductors, a plurality of transformers connected to said input conductors, a plurality of control conductors, means to apply any one of a plurality of discrete combinations of potentials to said control conductors, wherein each discrete potential combination is distinctive to one of said input conductors, an output conductor, a current responsive device connected to said output conductor, a plurality of asymmetrical circuit elements, said asymmetrical circuit elements and said transformers arranged to selectively provide low impedance electrical paths between any one of said input conductors and said output conductor, said low impedance electrical path selectively rendered conductive by the application of the discrete control conductor voltage combination which is distinctive to said input conductor.

7. A scanning network comprising a plurality of input conductors, means to apply a significant potential to any one of said input conductors, a plurality of transformers, a plurality of control conductors, means to apply any one of a plurality of discrete combinations of potentials to said control conductors, wherein each discrete potential combination is distinctive to one of said input conductors, an output conductor, a current responsive device connected to said output conductor, a plurality of asymmetrical circuit elements connecting said control conductors and said transformers, said asymmetrical circuit elements and said transformers arranged to selectively provide low impedance electrical paths between any one of said input conductors and said output conductor, said low impedance electrical path selectively rendered conductive by the application of the discrete control conductor voltage combination which is distinctive to said input conductor.

8. A scanning network comprising a plurality of input conductors, means to apply a significant potential to any one of said input conductors, a plurality of transformers connected to said input conductors, a plurality of control conductors, means to apply any one of a plurality of discrete combinations of potentials to said control conductors, wherein each discrete potential combination is distinctive to one of said input conductors, an output conductor, a current responsive device connected to said output conductor, a plurality of asymmetrical circuit elements connecting said control conductors and said transformers, said asymmetrical circuit elements and said transformers arranged to selectively provide low impedance electrical paths between any one of said input conductors and said output conductor, said low impedance electrical path selectively rendered conductive by the application of the discrete control conductor voltage combination which is distinctive to said input conductor.

9. A marking network comprising an input conductor, means to apply significant potentials to said input conductor, a plurality of output conductors, each of said output conductors connected to a significant potential, a plurality of control conductors, means to apply any one of a plurality of discrete combinations of potentials to said control conductors, each discrete potential combination distinctive to one of said output conductors, a plurality of transformers, a plurality of asymmetrical circuit elements, said asymmetrical circuit elements and said transformers arranged to selectively provide a low impedance electrical path between said input conductor and any one of said output conductors, said low impedance path selectively rendered conductive by the application of the discrete control conductor voltage combination which is distinctive to said output conductor.

10. A marking network comprising an input conductor, means to apply significant potentials to said input conductor, a plurality of output conductors, a plurality of current responsive means connected between each of said output conductors and a significant potential, a plurality of control conductors, means to apply any one of a plurality of discrete combinations of potentials to said control conductors, each discrete potential combination distinctive to one of said output conductors, a plurality of transformers connected to said output conductors, a plurality of asymmetrical circuit elements and said transformers, said asymmetrical circuit elements and said transformers arranged to selectively provide a low impedance electrical path between said input conductor and any one of said output conductors, said low impedance path selectively rendered conductive by the application of the discrete control conductor voltage combination which is distinctive to said output conductor.

11. A marking network comprising an input conductor, means to apply significant potentials to said input conductor, a plurality of output conductors, a plurality of current responsive means connected between each of said output conductors and a significant potential, a plurality of control conductors, means to apply any one of a plurality of discrete combinations of potentials to said control conductors, each discrete potential combination distinctive to one of said output conductors, a plurality of transformers, a plurality of asymmetrical circuit elements connecting said control conductors and said transformers, said asymmetrical circuit elements and said transformers arranged to selectively provide a low impedance electrical path between said input conductor and any one of said output conductors, said low impedance path selectively rendered conductive by the application of the discrete control conductor voltage combination which is distinctive to said output conductor.

12. A marking network comprising an input conductor, means to apply significant potentials to said input conductor, a plurality of output conductors, a plurality of current responsive means connected between each of said output conductors and a significant potential, a plurality of control conductors, means to apply any one of a plurality of discrete combinations of potentials to said control conductors, each discrete potential combination distinctive to one of said output conductors, a plurality of transformers connected to said output conductors, a plurality of asymmetrical circuit elements connecting said control conductors and said transformers, said asymmetrical circuit elements and said transformers arranged to selectively provide a low impedance electrical path between said input conductor and any one of said output conductors, said low impedance path selectively rendered conductive by the application of the discrete control conductor voltage combination which is distinctive to said output conductor.

13. A translating network comprising a plurality of input conductors, means to connect a significant potential to any one of said input conductors, a plurality of transformers, a plurality of output conductors, means to apply significant combinations of potentials to said output conductors, a plurality of asymmetrical circuit elements, said asymmetrical circuit elements and said transformers arranged to provide unique low impedance electrical paths between any one of said input conductors and said output conductors.

14. A translating network comprising a plurality of input conductors, means to connect a significant potential to any one of said input conductors, a plurality of transformers connected to said input conductors, a plurality of output conductors, means to apply significant combinations of potentials to said output conductors, a plurality of asymmetrical circuit elements, said asymmetrical circuit elements and said transformers arranged to provide unique low impedance electrical paths between any one of said input conductors and said output conductors.

15. A translating network comprising a plurality of input conductors, means to connect a significant potential to any one of said input conductors, a plurality of transformers, a plurality of output conductors, means to apply significant combinations of potentials to said output conductors, a plurality of asymmetrical circuit elements connecting said output conductors and said transformers, said asymmetrical circuit elements and said transformers arranged to provide unique low impedance electrical paths between any one of said input conductors and said output conductors.

16. A translating network comprising a plurality of input conductors, means to connect a significant potential to any one of said input conductors, a plurality of transformers connected to said input conductors, a plurality of output conductors, a plurality of current responsive means connected between said output conductors and a significant potential, a plurality of asymmetrical circuit elements connecting said output conductors and said transformers, said asymmetrical circuit elements and said transformers arranged to provide unique low impedance electrical paths between any one of said input conductors and said output conductors.

17. A translating network comprising a plurality of input conductors, means to apply any one of a plurality of combinations of potentials to said input conductors, a plurality of output conductors, a plurality of current responsive means, a plurality of transformers, a plurality of asymmetrical circuit elements, said asymmetrical circuit elements and said transformers arranged to provide unique low impedance electrical paths between said input conductors and any one of said output conductors.

18. A translating network comprising a plurality of input conductors, means to apply any one of a plurality of combinations of potentials to said input conductors, a plurality of output conductors, a plurality of current responsive means connected between said output conductors and a significant potential, a plurality of transformers connected to said output conductors, a plurality of asymmetrical circuit elements, said asymmetrical circuit elements and said transformers arranged to provide unique low impedance electrical paths between said input conductors and any one of said output conductors.

19. A translating network comprising a plurality of input conductors, means to apply any one of a plurality of combinations of potentials to said input conductors, a plurality of output conductors, a plurality of current responsive means connected between said output conductors and a significant potential, a plurality of transformers, a plurality of asymmetrical circuit elements connected between said input conductors and said transformers, said asymmetrical circuit elements and said transformers arranged to provide unique low impedance electrical paths between said input conductors and any one of said output conductors.

20. A translating network comprising a plurality of input conductors, means to apply any one of a plurality of combinations of potentials to said input conductors, a plurality of output conductors, a plurality of current responsive means connected between said output conductors and a significant potential, a plurality of transformers connected to said output conductors, a plurality of asymmetrical circuit elements connected between said input conductors and said transformers, said asymmetrical circuit elements and said transformers arranged to provide unique low impedance electrical paths between said input conductors and any one of said output conductors.

No references cited.